United States Patent [19]

Tsuruta

[11] Patent Number: 4,572,706

[45] Date of Patent: Feb. 25, 1986

[54] DESALTING IRRIGATION AND ITS APPARATUS

[76] Inventor: Yasuo Tsuruta, 22-2, 4-chome, Sanno, Ota-ku, Tokyo, Japan

[21] Appl. No.: 359,492

[22] Filed: Mar. 18, 1982

Related U.S. Application Data

[63] Continuation-in-part of Ser. No. 147,229, May 6, 1980, abandoned.

[51] Int. Cl.⁴ .................. A01G 27/00; E02B 13/00
[52] U.S. Cl. ............................ 405/36; 405/44; 47/48.5
[58] Field of Search ............... 405/36, 43-46, 405/50, 51; 47/48.5; 210/170

[56] References Cited

U.S. PATENT DOCUMENTS

| | | | |
|---|---|---|---|
| 931,032 | 8/1909 | Bussman | 210/170 |
| 1,052,121 | 2/1913 | Austin | 405/44 |
| 1,805,993 | 5/1931 | Miller | 405/36 X |
| 3,408,818 | 11/1968 | Hemphill | 405/44 X |
| 3,456,802 | 7/1969 | Cole | 210/170 |
| 3,479,825 | 11/1969 | Hellstrom | 405/36 X |
| 3,528,251 | 9/1970 | Falk | 47/48.5 X |
| 3,754,352 | 8/1973 | Bates | 47/48.5 |
| 4,060,991 | 12/1977 | Reese | 405/36 |
| 4,122,012 | 10/1978 | Vlasnik | 210/170 |
| 4,199,272 | 4/1980 | Lacey | 405/50 |

Primary Examiner—Cornelius J. Husar
Assistant Examiner—Nancy J. Stodola
Attorney, Agent, or Firm—Brisebois & Kruger

[57] ABSTRACT

A salt damage preventive irrigation method and its apparatus. In this irrigation method, the poisonous salt contained in irrigation water can be concentrated near the emitting opening of an emitter and the moistened area can be prepared in the soil with water free of salt contained in the irrigation water.

7 Claims, 3 Drawing Figures

DESALTING IRRIGATION AND ITS APPARATUS

BACKGROUND OF THE INVENTION

This is a continuation-in-part of Ser. No. 147,229, abandoned, filed May 6, 1980, and the entire disclosure thereof is incorporated herein by reference.

As agricultural irrigation, basin irrigation has been used generally but it is not suitable for agricultural irrigation of very dry land.

Recently, sprinkler and drip irrigation techniques are being tried in developing farms in dry land, however, there are problems pertaining to salt damage as well as sterilization of the soil by salt.

SUMMARY OF THE INVENTION

The object of the present invention is to concentrate poisonous salt contained in irrigation water near the opening of an emitter to provide a moistened area in the soil with water free of the salt contained in irrigation water.

The fact that an ideal moistened area in pot-like form can be prepared by feeding a small amount of water constantly to sandy cultivation bed is disclosed in Ser. No. 147,229.

In the invention of Ser. No. 147,229, it is disclosed that the level of water in a reservoir which supplied water to a tank in a water feed casing or emitter, can be lower than the level of the water in the tank. This is permitted by virtue of the use of a filler material within the casing and which contacts the water in the tank. By virtue of the fact that the casing is sealed, and is well sealed to the surface of the soil, the filler material conveys the water from its lower level in the tank upwardly and over the sides of the tank from which the water permeates the filler and very slowly infuses into the soil. While it is not completely clear what happens within the casing to cause the water to very slowly permeate the filler material, it is believed that some transmission of the moisture to the filler material occurs as a result of evaporation of the water from the tank with its consequent condensation or travel of the resulting vapor through the filler materal.

Regardless, however, of the precise physical phenomena which occurred, it has been found that salts in the irrigation water tend to concentrate in a narrow region immediately below the casing, as well as adjacent the surface of the soil around the casing. Such concentration of salts from the water near the surface of the casing is believed to be due to the tendency for a small amount of evaporation to occur in the region immediately surrounding the casing with the result that the salts which permeate the filler material tend to concentrate in the evaporation region.

The phenomena of salt concentration in the region immediately beneath and closely adjacent to the casing is believed to occur as a result of the very slow rates of infusion of the moisture into the earth. As a result of these phenonmena it has been found that the method and apparatus disclosed in Ser. No. 147,229, can be used to irrigate plants and permit agriculture in very dry and arid regions even though the irrigation water contains some quantities of salt. Such agriculture is permitted by virtue of the fact that the salt tends to concentrate around the casing as well as in the region immediately beneath the casing, while the moistened area extends laterally of the casing beneath the soil surface. This permits growing plants in a region spaced laterally of the casing, the roots of the plants tending to migrate sideways toward the moistened region to fully use the moisture provided by the casing. However, the roots will only migrate as far as they need to in order to communicate with the moisture. Thus, the regions of salt concentration immediately around the casing and near the surface, and immediately beneath the casing are not reached by the roots which are content to merely be within a moist zone which extends a considerable distance around the casing but somewhat beneath the surface of the soil.

It has been found, however, in accordance with this invention that the salts in the irrigation water cannot always be concentrated near the surface of the soil or immediately beneath the irrigation casing. Where the soil is somewhat coarse, in contrast to a fine sandy soil, there is more tendency for the salts to migrate greater distance from the casing. In soils of such a character, where the salt does migrate, it is not possible to remove the salt contaminated soil, and as a result, repeated irrigation by the technique of Ser. No. 147,227 results in salt pollution of the soil with ultimate sterilization to the point where the soil can no longer sustain plant life. In most instances, however, especially where the soil is composed of fine sand or other fine particles, the salt will concentrate in the region immediately surrounding the casing as well as in the region immediately beneath the filler material and the casing, and can be readily removed at the time of harvest so that the problem of salt pollution or sterilization can be avoided.

In accordance with this invention an additional technique is provided which prevents concentration of salts from the irrigation water in the soil so that salt pollution of the soil and sterilization thereof is considerably minimized and virtually eliminated.

In accordance with the invention such poisonous salt is prevented from contaminating the soil by providing a relatively small quantity of a salt absorbing material in the region directly beneath the casing sealed to the soil surface. This salt absorbing material is preferably in the form of granules or a pulverant of for example, activated carbon or calcite, and the amount to be used and its depth beneath the casing will of course depend on the nature of the soil and the salt content of the water used for irrigation. Where the soil is relatively sandy or fine, it has been found that only a small quantity of salt absorbing material beneath the irrigation casing is required. On the other hand, where the soil is relatively coarse and gravel-like, a greater quantity is required, and the region occupied by the absorbing material may extend laterally beyond the sides of the casing, but beneath the surface of the soil. In some instances it is also desirable to extend the filler material within the casing downwardly somewhat as well as laterally, which serves the further purpose of extending or expanding the area of the soil which is moistened, so that larger plants like trees can effectively be irrigated.

It is to be appreciated however that the technique of this invention is practical and permissable only where moisture is infused into the soil at a very low rate, practically in the form of a vapor. Where high flow rates of water are used, as in the prior art methods of irrigation, the water has a tendency to dissolve or leach the salts from the salt absorbing materials with the result that the salt is carried through the absorbing materials and into the soil with the detrimental soil poisoning effects previously referred to.

Accordingly, an object of this invention is to provide a technique and equipment or apparatus for irrigating plants in very dry regions, wherein the water used for irrigation can contain some salt.

Another object is an irrigation technique which permits agriculture in very arid regions, using irrigation water containing salt, and in which the salt is both concentrated and absorbed before the salt can reach the roots of the growing plants.

A further object is a technique for irrigating plants especially in dry regions, using water containing salt as the irrigation water, and in which the salt is absorbed by a salt absorbing material placed immediately adjacent to an irrigation casing from which moisture flows at a very low rate, to prevent poisoning and sterilizing the soil with the salt.

Other features and objects of the invention will become apparent with reference to the accompanying drawings.

DETAILED DESCRIPTION

Figure 1:
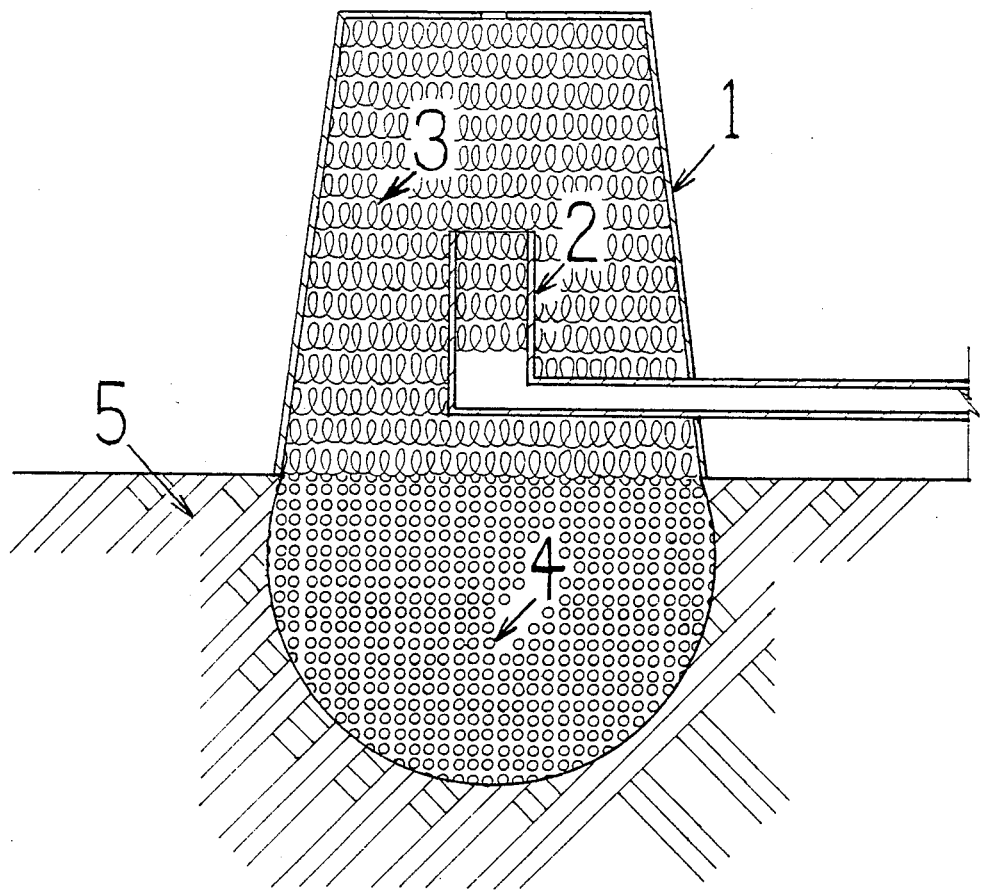
FIG. 1 is a view in vertical section of an irrigation casing according to the invention showing one technique of locating salt absorbing material near the outlet of the casing.

As shown at FIG. 1 there is an irrigation casing 1 having therein a tank 2 which receives water through a conduit from a constant level water source (not shown) but which can be the constant level water source 5 shown and described in Ser. No. 147,229. Further, while not shown, the various water supply arrangements of that application can be used with this invention.

The casing 1 is air tight and is completely filled with a filler material 3 which extends downwardly into the tank 2 within the casing. The level of the irrigation water in the tank 2 is considerably below the top of the tank, and as disclosed in Ser. No. 147,229, the level of the water in the reservoir which supplies the water to the tank 2 is lower than the top of the tank 2.

As explained in Ser. No. 147,229, the transmission of moisture from tank 2 to the surface of the earth beneath casing 1 and which is contacted by the filler 3 is via a capillary effect coupled with a very slight siphon effect resulting from the region of moisture beneath the casing 1. As a result, there is a very slow but continuous infusion of water into the soil 5 at a very slow rate, this rate being merely sufficient to maintain a region of moisture which can extend a distance of approximately ten times the diameter of the casing in all directions around the casing, but beneath the surface of the soil. The fact that the region of moistened soil extends outwardly, permits growing plants some distance from the casing 1 even using irrigation water containing salt. This is because the salt has a tendency to concentrate in the region immediately surrounding the periphery of the casing at the location where it contacts the soil, as well as in the region immediately beneath the casing. This occurs because of the very slow infusion of the water or moisture into the soil.

However, when by the nature of the soil or the salt content in the irrigation water, it is found that salt tends to permeate some distance into the soil from the casing 1, that a small layer of salt absorbing material 4 immediately beneath the casing 1 will absorb the salt from even quite salty water and permit irrigation and agriculture in very arid regions. This salt absorbing material 4 can be activated charcoal or particles of calcite, or any other material which has the ability to remove at least some salt from moisture. In some instances, very fine sand can be used as the salt absorbing material 4, the sand having a tendency to remove the salt as crystals, which it can do as a result of the very slow infusion or permeation of moisture through the absorbing material and into the soil.

Figure 2:
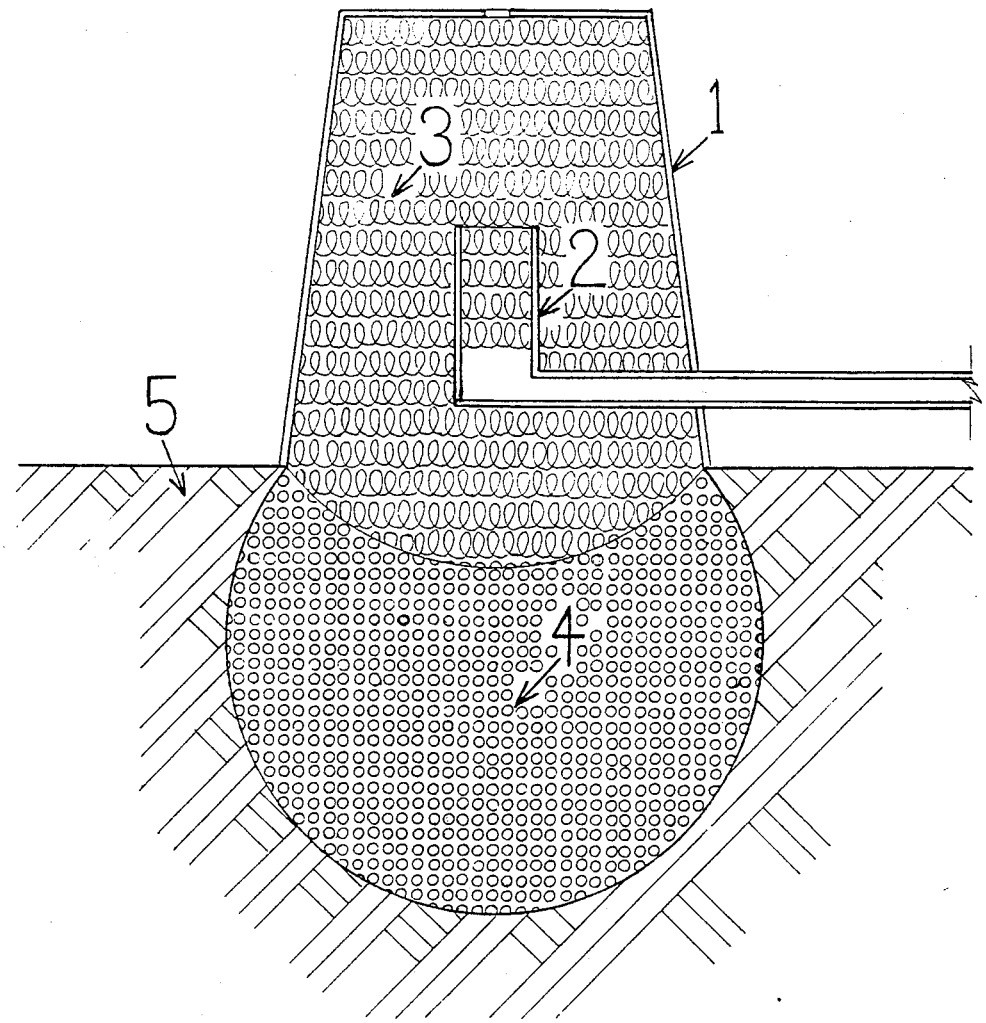
FIG. 2 is a view corresponding to FIG. 1 and showing a different arrangement of the salt absorbing material.

In the embodiment of FIG. 2 there is shown a different arrangement for the salt absorbing material 4. In this embodiment, the salt absorbing material 4, extends into a region laterally beyond the sides of casing 1, but beneath the surface of the soil. This arrangement of the salt absorbing material 4 permits moistening a much larger area of the soil in the region surrounding casing 1. The arrangement of FIG. 2 finds particular utility where the plant to be irrigated is a relatively large plant such as a tree. It is to be appreciated however that several casings such as the casing 1 will then be located around the tree, spaced apart from each other so that tree roots will not have a tendency all to grow in the same direction seeking water.

Figure 3:
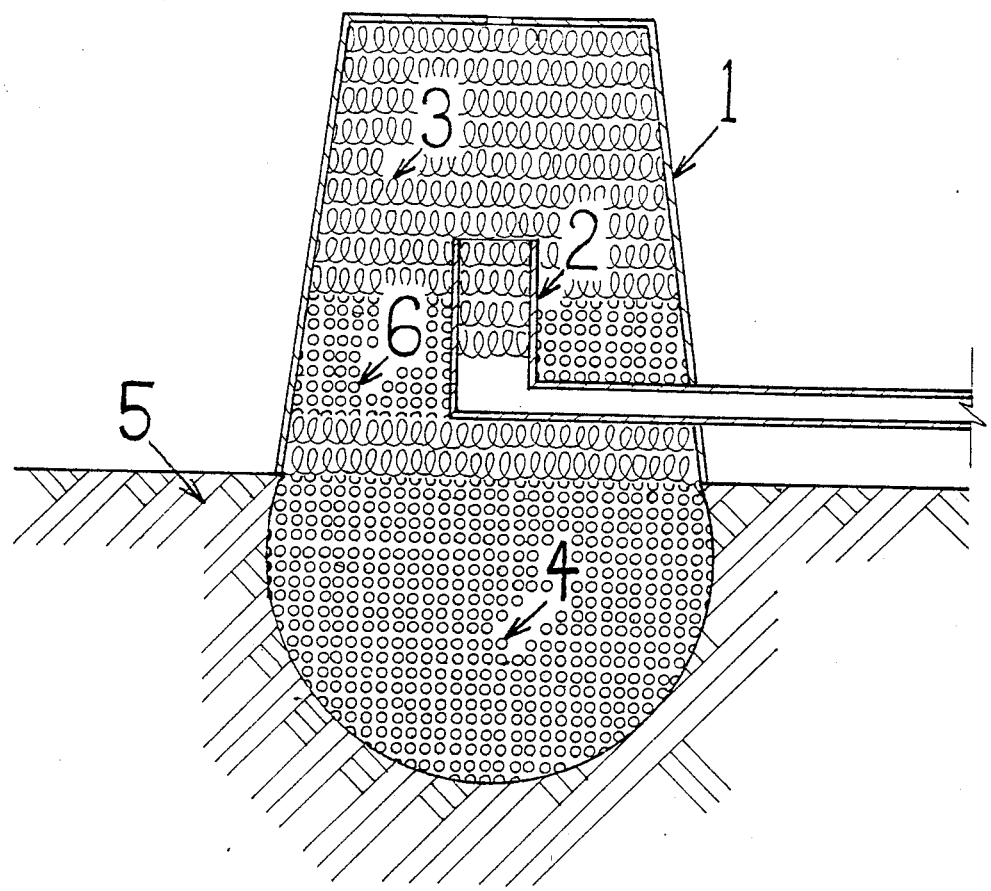
FIG. 3 shows yet another embodiment in which some of the salt absorbing material is located within the casing above its point of contact with the soil.

In the embodiment shown at FIG. 3, the salt absorbing material 4 beneath casing 1 occupies generally the same volume and area as that shown at FIG. 1. However, additional salt absorbing material 6 is used as part of the filler 3 within the casing. To an extent, this arrangement of FIG. 3 simplifies removing the salt absorbing material, shortly after harvest, to permit its reconditioning or rejuvenation for reuse during the next planting.

In all the embodiments, it is to be appreciated that the filler 3 within the casing is a porous material of a permeable type such as a porous resin, glass wool, cotton wool, or rock wool. This filler material 3 has the ability to provide moisture to the soil at a very slow rate so that there is no tendency to leach salts from the salt absorbing material, even when this salt absorbing material is a fine sand.

In all the embodiments, it will be noted that the bottom edge casing 1 is sealed with respect to the soil and it has been found that even in very dry regions, there is minimal evaporation of the moisture from the soil. This is because the surface of the soil tends to act as an insulating blanket, and the permeation of the water from the casing into the soil is more downwardly than laterally. Correspondingly, the region immediately surrounding the casing 1 is normally dry, and so avoiding surface moisture or water minimizes evaporation of the moisture introduced into the soil from the casing.

It is to be appreciated that the effect of the filler material 3 within the casing 1 is to maintain water in the fillers in a homogeneous amount. The travel of moisture through the fillers occurs at a very low rate which makes salt removal feasible, even though the irrigation is constant both day and night.

The casing 1 in the embodiments described can be a relatively small casing of six centimeters diameter which functions as the emitter or feeder of moisture into the soil. It has been found that by virtue of the feeding action of filler material 3, and the fact that the level in the reservoir which supplies water to the tank 2 is below the level of the top of the tank, it is possible to feed water at the very low rate of 0.0008 cc/sec/cm². At this very low rate of flow, the absorbing material 4 remains merely moistened, but not wet or flooded. As a result, the absorbing material 4 can more fully perform its function of removing the salt from the water without later leaching of the salt from this absorbing material. Correspondingly, the moistened area beneath the casing, beyond the salt absorbing material 4 receives the equivalent of fresh water which permits cultivation and agriculture even in very dry regions with minimum water loss from evaporation.

In accordance with one experiment in accordance with this invention, it was found that the water required to maintain sufficient moisture in the soil for growing corn could be attained by continuous irrigation at the rate of 2 liters of irrigation water per day. Since the evaporation is minimal, this is a considerable saving of water over any prior known technique.

It has been found that clay containing material tends to resist moistening in directions laterally around the casing 1. In the case of clay there is a tendency for the moisture to permeate more downwardly than laterally. Under these conditions, the salt absorbing material 6 within the casing 1 can be mixed with a more grannular material to somewhat increase the flow and infusion of water into the soil. As a result of the increased available flow with its attendant slightly higher hydrostatic pressure, better infusion of the moisture into clay like soils can be obtained. While the casing 1 shown in the embodiments of the drawings, can take the form of a relatively small inverted flow pot of about six centimeters diameter, it is to be understood that the usual opening in the underside of the pot, after initiation of the irrigation, sealed, to provide for continuous irrigation even when the level of the water in the supply reservoir is lower than the level of the top of the tank 2. It is believed evident that the continued flow of moisture then occurs as a result of the combination of capillary action and the very slight suction applied as a result of the depending region of moisture beneath the casing.

While preferred embodiments have been shown and described, changes can be made without departing from the scope and spirit of this invention.

I claim:

1. A method of irrigating a plant from a top surface of soil in which the plant is growing, comprising very slowly infusing water into the soil to a root region of the plant from an air-tight casing having an open bottom essentially sealed to the top surface of the soil, said infusing comprising infusing the water into the soil through a filler material within the casing from an upwardly opening outlet of a water supply receptacle in the casing, supplying water to the receptacle from a water source below the level of said upwardly opening outlet, placing a salt absorbing material between the outlet and the root region of the plant, passing the infusing water through the salt absorbing material between the outlet and the root region of the plant at a rate sufficiently low to remove salt from the infusing water and to prevent leaching of salt from the salt absorbing material.

2. The method of claim 1, wherein said infusing comprises infusing water at a rate of not more than about 0.008 cc/sec./cm².

3. The method of claim 1, wherein water is fed to the receptacle from a tank in which the level of the water is maintained below the level of the receptacle outlet.

4. A method according to claim 1 wherein the step of placing the salt absorbing material comprises placing the salt absorbing materail on the top surface of the soil immediately beneath the air-tight casing.

5. Irrigation apparatus for infusing water into a top surface of soil in which a plant is growing to irrigate a root region of the plant below the top surface comprising, a casing having an open bottom sealed to the top surface of the soil, and an airtight upper portion, a receptacle having an upwardly open outlet, means for supplying water to said receptacle to a level below said outlet, a filler within the casing, said filler material filling the casing and extending into the receptacle oulet at least to the level of the water in the receptacle, and means for absorbing salt from the water infusing to the root region of the plant, said means comprising a small layer of a salt absorbing material immediately beneath the open bottom of the casing, said sealed casing, filler, and receptacle comprising means for infusing water through the salt absorbing material at a rate less than the rate to cause leaching of absorbed salt from the material.

6. Apparatus according to claim 5 wherein said apparatus comprises means for infusing water into the soil at a rate not greater than about 0.0008 cc/sec./cm².

7. Apparatus according to claim 6 wherein said casing comprises a casing having a diameter not greater than about six centimeters in diameter.

* * * * *